(12) United States Patent
Faroldi

(10) Patent No.: US 6,572,002 B2
(45) Date of Patent: Jun. 3, 2003

(54) DEVICE FOR THE POSITIONING OF AN OPERATING MEMBER, AND A WELDING APPARATUS USING THE SAME

(76) Inventor: Bruno Faroldi, Via Berenini 119, Fidenza (IT), I-43036

( * ) Notice: Subject to any disclaimer, the term of this patent is extended or adjusted under 35 U.S.C. 154(b) by 0 days.

(21) Appl. No.: 10/056,007

(22) Filed: Jan. 28, 2002

(65) Prior Publication Data

US 2002/0175201 A1 Nov. 28, 2002

(30) Foreign Application Priority Data

Mar. 29, 2001 (IT) ...................... TO2001A0294

(51) Int. Cl.⁷ ................ B23K 13/08; B23K 37/00; B23K 37/04; B23Q 15/00
(52) U.S. Cl. .................... 228/8; 228/44.5; 228/49.3
(58) Field of Search .............. 228/8, 4.1, 6.1, 228/9, 10, 44.3, 44.5, 47.1, 49.3, 102

(56) References Cited

U.S. PATENT DOCUMENTS

| | | | | |
|---|---|---|---|---|
| 2,830,551 A | * | 4/1958 | Miller | 269/34 |
| 3,697,720 A | * | 10/1972 | Christopher | 219/611 |
| 3,920,171 A | * | 11/1975 | Clavin | 228/44.5 |
| 3,937,382 A | * | 2/1976 | Cunningham et al. | 228/49.3 |
| 4,126,065 A | * | 11/1978 | Clavin | 82/113 |
| 4,140,262 A | * | 2/1979 | Wilson et al. | 228/49.3 |
| 4,306,134 A | * | 12/1981 | Slavens et al. | 219/60 A |
| 4,708,279 A | * | 11/1987 | Dearman | 228/49.3 |
| 4,852,418 A | * | 8/1989 | Armstrong | 74/60 |
| 4,959,523 A | * | 9/1990 | Fihey et al. | 219/124.34 |
| 5,288,005 A | * | 2/1994 | Beakley et al. | 228/49.3 |
| 5,316,202 A | * | 5/1994 | Murray et al. | 228/5.5 |
| 5,356,067 A | * | 10/1994 | Leduc | 228/44.5 |
| 5,515,589 A | * | 5/1996 | Kazirskis et al. | 29/402.18 |
| 5,535,938 A | * | 7/1996 | Leduc | 228/212 |
| 6,109,503 A | * | 8/2000 | Parker | 228/44.5 |

* cited by examiner

Primary Examiner—Tom Dunn
Assistant Examiner—Zidia Pittman
(74) Attorney, Agent, or Firm—Young & Thompson

(57) ABSTRACT

A positioning device in which an operating member is solid with a mechanical touching member and is displaced together with it by computer controlled displacement devices; both the operating and the touching members are mounted on a common supporting member, thus forming a touching and operating unit on which act the computer controlled displacement devices. The computer is programmed in order to determine by means of the touching member, and to memorize, the positions of a plurality of points on which the operating member should perform its operation, then determining by interpolation the entire work trajectory of the operating member, which may particularly be a welding head; in this case, several touching and operating units form part of a welding apparatus, and particularly of a so-called coupler, intended to automatically perform the inner weldings between the sections of a piping, such as an oil pipeline or the like.

11 Claims, 3 Drawing Sheets

DEVICE FOR THE POSITIONING OF AN OPERATING MEMBER, AND A WELDING APPARATUS USING THE SAME

BACKGROUND OF THE INVENTION

The present invention has for its object a device for positioning an operating member, of the type in which an operating member provided with displacement means is coordinated with an explorative member intended to explore the object on which the operating member should act, in order to determine the correct positioning of the operating member. The invention also has for its object a welding apparatus using one or more said positioning devices, wherein said operating member is a welding head. The invention further has for its more specific object a welding apparatus of the mentioned kind (a so-called "coupler") particularly intended to perform the inner weldings between the sections of a tubing, such as an oil pipeline or the like.

In the known positioning devices of the mentioned kind, the explorative member generally is of an optical type, and it is displaced, independently from the operative member, within the field determined by the object on which the operation is to be performed, in order to plot some features of this object, suitable for determining the positions from which the operating member should then act. The results of the exploration are transmitted to a computer which, pursuant to a suitable interpretation of these data, controls the displacement means of the operating member in such a manner that this latter is carried in the thus determined positions. The whole of the employed means and of the operations that they should perform involves noticeable costs and, in view of the fact that several passes and elaborations are needed for arriving to position the operating member, the precision that can be attained may result relatively reduced or uncertain.

SUMMARY OF THE INVENTION

A first object of this invention is therefore to propose a device of the mentioned kind for the positioning of an operating member, which should be more simple in structure and operation and, through easily programmable operations, should ensure a high precision in the positioning.

A particular object of the invention is to allow using an explorative member having a purely mechanical nature, and therefore being simple, inexpensive, sturdy and free from any uncertainty and from sensitivity to troubles of any kind.

Still another object of the invention is to propose such a positioning device which should be particularly suitable for positioning a welding head in a welding apparatus.

In more specific applications, the invention aims to provide a positioning device particularly suitable for the use in an apparatus intended to perform the inner weldings between the sections which compose a tubing, such as an oil pipeline or the like.

As a consequence, it is also an object of the invention to provide a welding apparatus employing, for the positioning of the welding head or heads, positioning devices according to the invention, and a more specific object is to provide a welding apparatus, a so-called coupler, specifically intended for performing in an entirely automatic way the inner weldings between the sections intended to compose a tubing, such as an oil pipeline or the like.

The positioning device according to the invention is mainly characterized in that said explorative member is a mechanical touching member, that it is solid with the operating member, and that it is displaced together with the operating member by computer controlled displacement means, which are common to both the touching and the operating members.

In more detail, both said operating member and said touching member are mounted on a common supporting member on which act said computer controlled displacement means, thus forming a touching and operating unit.

Therefore, said mechanical touching member may be displaced, under control of the computer, in such a manner as to contact in succession, along different directions, a region of the object on which the operating member should act, in order to exactly determine the position in the space of the object and, more particularly, of its region on which the action should be performed.

Said determination takes place as a consequence of the stop of the explorative member, which happens when the explorative member contacts the object along a certain displacement direction. Therefore, when the different stop positions in which the contact has taken place have been memorized, it is then sufficient that the computer controls the same displacement means in such a way as to attain positions which are displaced, with respect to the memorized positions, of the fixed distance existing between the touching member and the working point of the operating member, in order to position this latter in the more precise possible way and without any intervening uncertainty.

The solid connection between the explorative member and the operating member, as well as the use of displacement means which are common to both said members, simplifies the device structure and prevents any mistake possibly due to different behaviors of separate displacement means for the explorative member and the operating member.

The use as explorative member of a simple mechanical touching member simplifies at the most and renders inexpensive the device structure and ensures the greatest simplicity in the interpretation of the information given by the explorative member.

Advantageously, said computer is programmed in order to determine by means of the touching member, and to memorize, the position of a plurality of points on which the operating member should perform its operation, then determining by interpolation the entire work trajectory of the operating member.

The displacement means are preferably arranged for providing positioning displacements of the operating and touching members according to a first and a second directions, mutually orthogonal, and to provide for the working shift displacements according to a third direction, orthogonal with respect to the first and second ones.

Said operating member may advantageously be a welding head. The unit formed by a touching member and an operating member being a welding head is advantageously included, in the number of one or more, in a welding apparatus, and particularly in an apparatus, a so-called coupler, intended to perform the inner weldings between the sections of a piping, such as an oil pipeline or the like.

Preferably, said welding apparatus comprises a body having means for being immobilized inside a tube section, and a revolving portion shaped like a roundabout, which carries said touching and operating devices. The body may comprise expandable jaws arranged in crowns, intended for centering and immobilizing said body inside the tube section. Particularly, the body may comprise three crowns of expandable jaws, namely: a rear crown having a centering and anchoring task, a front crown for anchoring the body to an already installed tube section, and an external crown for anchoring an additional tube section intended to be welded to the already installed tube section. The front and external jaw crowns may also have the task of improving, when needed, the circular outline of the end portions of the tube sections to be welded.

Advantageously, said body is provided with idle supporting wheels and driven advancement wheels; it includes an autonomous control group comprising at least a computer and an electric battery, is provided with a control board and may be connected to external feed and control means through a composite cable.

BRIEF DESCRIPTION OF THE DRAWINGS

These and other features, objects and advantages of the present invention will more clearly appear from the following description of a preferred embodiment, to be regarded as a non-limiting example, with reference to the appended drawings, wherein.

DESCRIPTION OF THE PREFERRED EMBODIMENT

Figure 1:
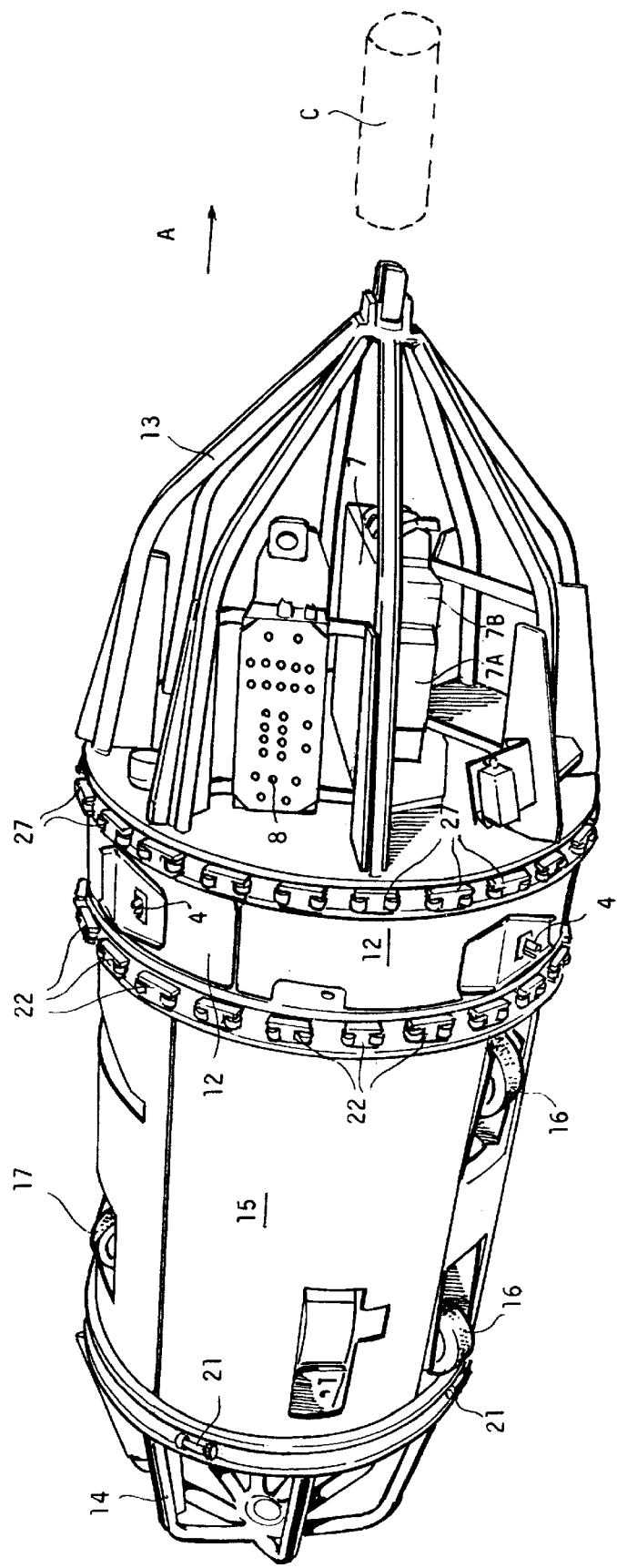
FIG. 1 shows in perspective an apparatus, a so-called coupler, intended for performing in an entirely automatic way the inner weldings between tube sections appointed to compose a piping, such as an oil pipeline or the like, this apparatus using a number of positioning devices according to the invention.
Figure 2:
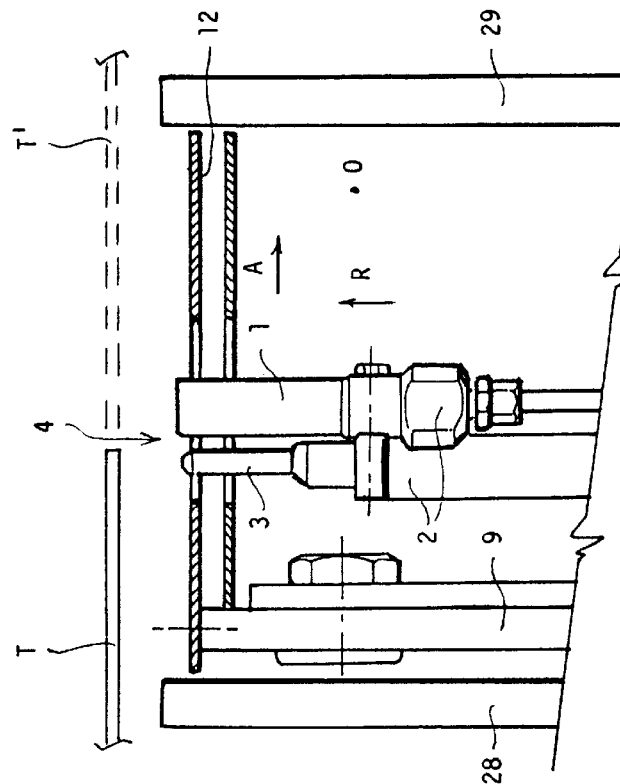
FIG. 2 shows a number of welding machines forming part of the apparatus according to FIG. 1.
Figure 3:
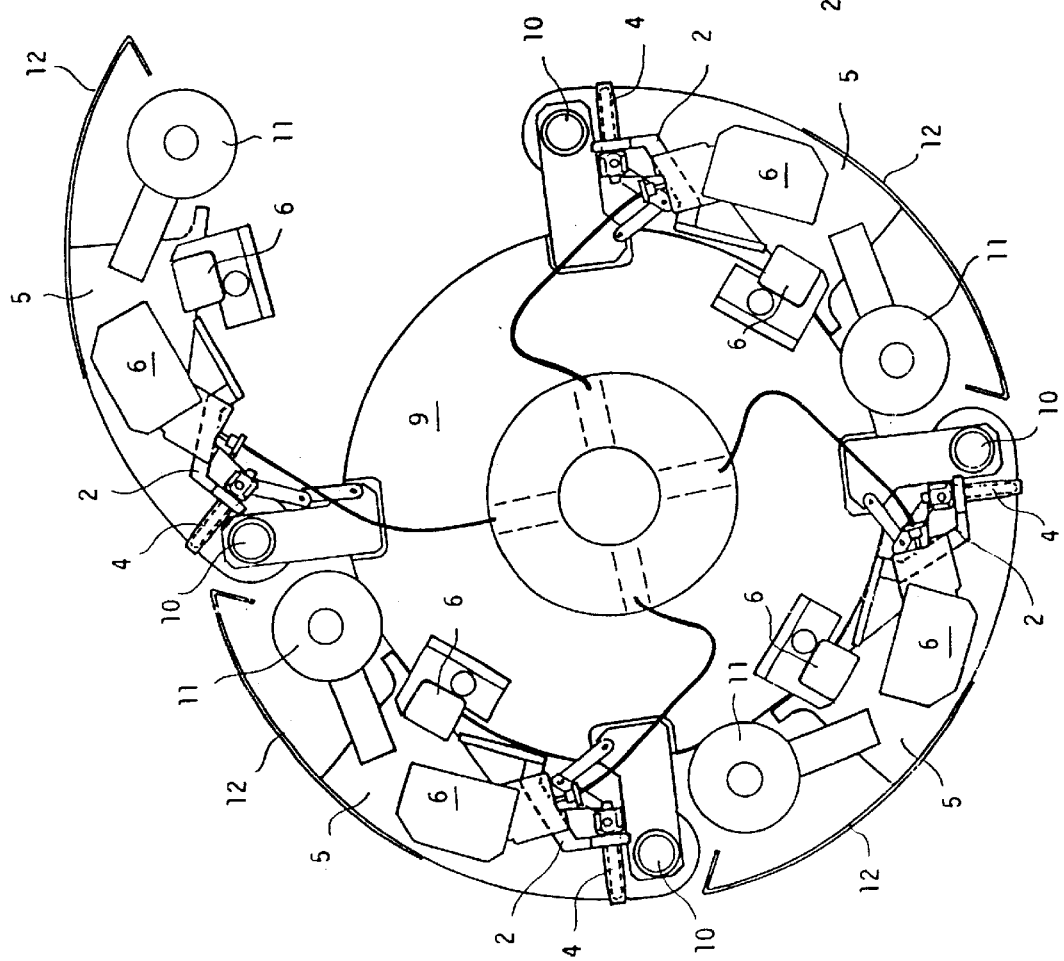
FIG. 3 shows in detail, on a larger scale, the unit formed by a welding head and a mechanical touching member, in a positioning device according to the invention.

The essential principle of the invention is mainly clarified by FIG. 3, which refers to a detail of the apparatus according to FIG. 1, but may be construed in a more general sense. As it may be observed in FIG. 3, the operating member 1 (which in the shown example is a welding head) is mounted on a supporting member 2, which also carries an explorative member 3 consisting of a mechanical touching member. The operating member 1 and the touching member 3 are rigidly connected to the supporting member 2, and therefore they are mutually solid, and form in their whole an operating and touching unit 4, which is so designed in FIGS. 1 and 2.

As it may be observed from FIG. 2, the supporting member 2 is pivoted on an operatively fixed plate 5 and connected to a motor group 6 arranged for controlling the displacements of the supporting member 2, and therefore of the operating and touching unit 4, according to two directions which, referring to FIG. 3, are a direction A (which will be considered the axial direction) and a direction R (which will be considered the radial direction). A third displacement direction, represented by point O, corresponds to the operative displacement of working shift of the operating member 1, and this will be treated later on.

The apparatus of which the above described components form part comprises a control group 7 provided with a control board 8. The control group is diagrammatically shown as a single bonnet 7, but in the practical embodiments the control group may also be composed of various parts installed in different positions in the apparatus, for example inside the rear portion of the apparatus. The control group includes, among other things, an electric battery 7A intended to render autonomous the apparatus, and a computer 7B. Among the tasks of computer 7B there is that of controlling the motor group 6 which drives the displacements of the operating and touching unit 4, and that of elaborating and putting into practice the controls coming from control groups, control boards and computers, installed at a distance from the apparatus.

As a consequence, the operating and touching unit 4, under control of a suitable program of the computer 7B included in the control group 7 and/or of an external computer, may be displaced from a rest position shown in FIG. 3, along the radial direction R and the axial direction A, in such a way as to bring the touching member 3 to contact, along different directions, against a workpiece T (in the example, a tube section) on which is intended to act the operating member 1. The contact of the touching member 3 against the workpiece T is noticed by the computer as a consequence of the stopping of the motor pertaining to motor group 6, which takes place when said contact happens. The computer then memorizes the position of the touching member 3 in correspondence of which the contact has taken place. In this manner, the coordinate of the corresponding position of the workpiece T has been memorized. At the end of all programmed displacements of the touching member 3, all the co-ordinates are memorized, which are needed for defining the position in the space of the workpiece T, and therefore the positions in the space wherein the operating member 1 should operate.

At this point, the computer 7B has no difficulty in controlling the motor group 6 in order to displace the operating member 1 to the correct memorized work position, because the distance between the operating member 1 and the touching member 3 is fixed. Therefore, the computer has simply to control the motor group 6 in order to displace the supporting member 2 to a position whose distance from the formerly memorized position corresponds to the fixed distance between the operating member 1 and the touching member 3.

The work position may therefore be obtained with a great precision and without any uncertainty, because the position of the workpiece T has been determined in a mechanically positive way, and the displacement means which displace the operating member to the correct working position are the same ones that have formerly displaced the touching member to contact with the region of the workpiece which is to be worked.

Usually, the operating member 1 should perform a repeated operation, continuously or on separated points, by displacing with respect to the workpiece T according to the working shift direction O. This work shift may be controlled by the computer in any usual way. In the described example, a number of positioning devices as that described above are mounted on a roundabout 9 that, driven by a motor not shown, is made to rotate in a suitable way under control of the computer, in order to provide the shift along direction O of the supporting member 2 and, therefore, of the touching member 3 during the exploration step, and then of the operating member 1 during the working step of each device.

The various devices comprising the operating and touching units 4 have the respective supporting plates 6 pivoted at 10, in order that they may be displaced outwards (as the unit at top of FIG. 2) for verification, maintenance and supplying operations.

As already said, the positioning device according to the invention may be used in connection with any kind of operating member 1, but it is particularly suitable for the use in welding apparatuses, wherein the operating member 1 is a welding head, as in the shown example, which refers to a coupler for tubing sections. In this case, each device mounted on a supporting plate 5 according to FIG. 2 forms a welding machine, which is per se known, except in what concerns the operating and touching unit 4. The welding machine comprises a support 11 for a welding wire and the mechanisms, per se known, intended for advancing the welding wire. In this case the computer 7B also has the task of suitably and timely feeding and operating the weld heads. The weld heads attain the work position, and the touching member attains the exploration position through a window opened in an arcuate sector 12 projecting from the periphery of each supporting plate 5. The whole of the various arcuate sectors 12 forms, in the operative conditions, a ring as shown by FIG. 1. This ring is intended to rotate in order to perform the exploration operations on different portions of the work region by means of the touching members 3 and, thereafter, for performing the working shift displacements of the operating members 1.

In view of the accuracy which may be obtained from the positioning devices according to the invention, it is possible to provide welding apparatuses suitable for operating in a completely automatic manner, and this, particularly, for executing the inner weldings between the sections of a tubing, such as an oil pipeline or the like. An apparatus of this kind, or coupler, is an object of the present invention too, and to this apparatus refer all the following in this description. The welding apparatus, in order that it may suitably exploit the good performances given by the positioning devices according to the invention, should be capable of being immobilized in a correct and stable position inside a tube section, when it performs the explorations and the weldings, and in order to be able to operate in an automatic way or under remote control, it should also be capable of traveling along the tube. In the following of the present description there are described some devices intended for allowing in the best manner the performance of these operations.

Figure 5:
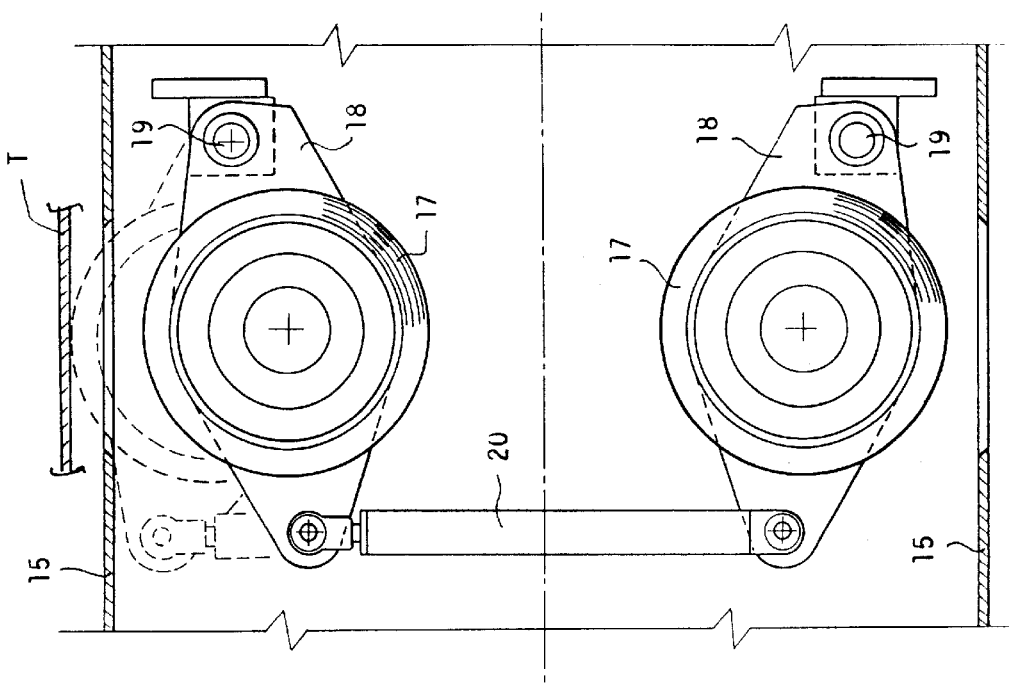
FIG. 5 shows a mechanism intended for rendering self-driving the whole of the apparatus according to FIG. 1.

The apparatus, shown in its whole in FIG. 1, has the general shape of a cylinder whose external diameter is lesser than the inner diameter of the tubes on which it should operate. The main cylindrical body of the apparatus is designed by reference 15, and it ends at front and rear with protection cages 13 and 14. It has idle supporting wheels 16 and driven advancement wheels 17. With reference to FIG. 5, the wheels 17, which are driven by a motor, not shown, are mounted on a support 18 pivoted at 19 and displaceable by means of a hydraulic cylinder 20 in order to displace the wheels 17 between a rest position as shown and an active position. In the rest position, the wheels 17 are located inside the cylindrical body 15, whereas in the active position (shown by broken lines for the upper wheel 17 of FIG. 5) said wheels project through a window of body 15, may act against the inner wall of tube T, and therefore are thus able to cause an axial displacement of the apparatus, in order to carry the same near the working position.

Figure 4:
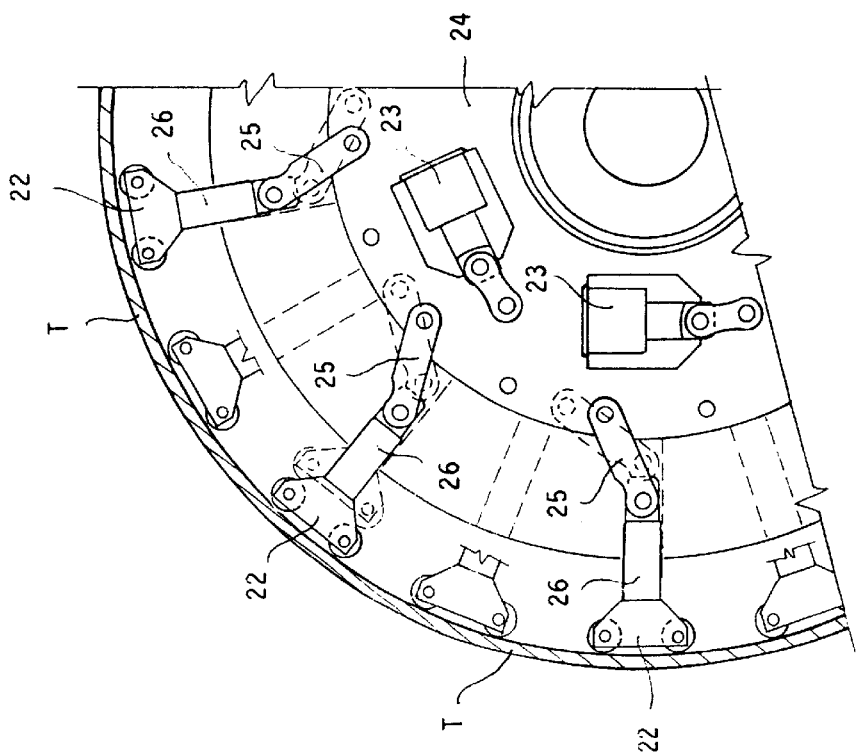
FIG. 4 shows a part of a system of centering and anchoring jaws forming part of the apparatus according to FIG. 1.

In its working position, the apparatus is centered and blocked with respect to the tube T, in which it is located, by means of a crown of rear jaws 21 and a crown of front jaws 22. The mechanism driving said jaws 22 is shown in FIG. 4. It comprises hydraulic cylinder and piston units 23 that, under computer control, cause the rotation of a disk 24 to which are pivoted rods 25. These rods are arranged for pushing outwards guided cursors 26, each of which carries a front jaw 22. In this way, the front jaws 22 can be pushed against the inner wall of tube T, in the shown position. The front jaws 22 (which are intended to be located near to the weld region) have the two functions, of centering and anchoring the apparatus to the tube T and of perfecting the end portion of tube T in case that this latter has some circularity imperfections. For this reason the front jaws 22 are numerous, as shown by FIG. 1. In FIG. 4 the representation is partially simplified for reasons of clearness.

On the contrary, the rear jaws 21 have the sole function of centering and anchoring the apparatus with respect to the tube T in which it is located, and therefore they may be in a lesser number than the front jaws 22. The control mechanism for the rear jaws 21 may be completely similar to the control mechanism for the front jaws 22, shown by FIG. 4.

The apparatus further includes a crown of external jaws 27, which are completely similar in their arrangement and control mechanisms to the front jaws 22. The external jaws are intended to center and anchor an additional tube section T', that should be welded in prolongation of the tube section T, already installed, wherein the welding apparatus is located, and, when needed, to render exactly circular the end portion of the tube section T'.

The roundabout 9–12 which carries the touching and welding devices according to the invention is rotatably mounted between a first fixed disk 28, adjacent to the crown of front jaws 22, and a second fixed disk 29, adjacent to the crown of external jaws 27. All the jaws 21, 22 and 27 are preferably provided with little wheels in order to prevent the crop up of parasitic tangential and axial strains, thus obtaining that the jaws exert only the forces needed. More particularly, said little wheels are pivoted along the axial direction of the apparatus in the front and external jaws 22 and 27, whereas they are pivoted in a tangential direction in the rear jaws 21.

The working manner of the described welding apparatus is as follows. The apparatus is inserted in a tube section T already installed, wherein it may displace axially by traveling on the idle wheels 16. All the actions described in the following may be controlled from the control board 8, as long as this latter may be accessed, and thereafter at a distance through a composite cable C. The composite cable C includes electric wires and hydraulic tubings, and it is connected to the front end portion of the apparatus and to an external feed and control station, not shown. The composite cable C is formed by a tubular rod inside which are located feeding electric cables, electric wires transporting the signals and tubings for the hydraulic feed of the apparatus. Advantageously, the composite cable C is provided at its ends with quick coupling connectors. In the external feed and control station there are repeated the commands present in the control board of the apparatus.

In order to start the operation, the apparatus is displaced within the tube T wherein it has been installed, by means of the driven wheels 17, until the touching and welding units are situated near to the free end of the tube section T, namely, in the position shown in FIG. 3. When this position has been attained, the apparatus is anchored and centered inside the tube by causing the crown of rear jaws 21 to expand, then the crown of front jaws 21 is caused to expand, thus completing the centering of the apparatus and, if needed, perfecting the circular shape of the free end of the tube section T. The crown of jaws 27 is now external to the tube section T and, at this time, it is left inoperative.

The touching and welding units are then activated under computer control. The touching members 3 are displaced serially, and if needed repeatedly, in the radial direction R and the axial direction A, until the position of a series of points of the end region of tube section T, which should receive the welding, has been exactly determined. This operation is repeated several times on different welding regions by causing the roundabout 9 to rotate, whereby the computer can memorize a series of separate positions wherein the weldings are required to pass. Then the intermediate positions among the thus determined positions may be determined by interpolation, thus defining complete welding trajectories. The exploration step is thus concluded.

At this time, an additional tube section T' is brought on the prolongation of the tube section T (by causing the additional tube section to pass around the composite cable C) until its end portion contacts the free end of the tube section T, in the position shown by broken lines in FIG. 3. When the additional tube section T' is so arranged, the crown of external jaws 27 finds itself inside the additional tube section and near to the end portion thereof, but it does not hinder the positioning of the tube section because said crown of external jaws still is inoperative. When the additional tube section T' has been brought to its correct position, it is anchored in this position by causing the crown of external jaws 27 to expand. These jaws block in position the additional tube section T' and, if needed, they improve its circular outline. The end portions of the tube sections T and T' are thus contacting and mutually confusing.

The welding operation may then be started. Under computer control, by using the information previously memorized during the exploration step, the welding heads 1 are displaced to the correct welding positions and, thanks to the rotation of the roundabout 9, they continuously follow the pre-established welding trajectories, thus performing in a precise manner the inner welding of the whole outline of the facing end portions of the tube sections T and T'.

When this operation is completed, the crowns of jaws 21, 22 and 27 are retracted, and the apparatus may be made to advance inside the additional tube section T' until near to its free end portion. At this point the entire operation may start again, in a manner identical to that already described, for adding another tube section.

It may therefore be understood that, thanks to the use of a touching and welding unit according to the invention, precise, quick and automatic operations may be obtained by using simple operating means. It may also be understood that, thanks to the other features described, improved welding apparatuses may be provided, and particularly apparatuses intended to perform the inner weldings between sections of a tubing, such as an oil pipeline or the like. The operation of such apparatuses can be entirely automated, contrary to the exploitation of the apparatuses according to the known techniques, which requires severe attendance by highly qualified personnel.

It should be realized that this invention is not limited to the embodiment described and shown by way of example; in the contrary, several modifications are possible for those skilled in the art. These modifications, and any replacement by technically equivalent means, may be done in what has been described and shown, without departing from the spirit of the invention and the scope of this Patent, as defined by the claims.

| LIST OF REFERENCES | | | |
|---|---|---|---|
| A | axial direction of apparatus | R | radial direction of apparatus |
| O | work shift direction | | |
| T | workpiece (a tube section) | T' | additional tube section |
| C | composite cable | | |
| 1 | operating member | 2 | touching member |
| 3 | supporting member | 4 | operating and touching unit |
| 5 | operatively fixed plate supporting welding machines | | |
| 6 | group of motors | | |
| 7 | bonnet of the control group | | |
| 7A | battery | 7B | computer |
| 8 | control board | | |
| 9 | roundabout which carries the supporting members 3 | | |
| 10 | pivot of the unit 4 | 11 | support for welding wire |
| 12 | arcuate sector with windows | | |
| 13 | front protection cage | 14 | rear protection cage |
| 15 | body of the apparatus | | |
| 16 | idle supporting wheels | 17 | driven advancement wheels |
| 18 | wheels support | 19 | pivot of the wheels support |
| 20 | hydraulic cylinder | | |
| 21 | rear jaws | 22 | front jaws |
| 23 | hydraulic unit with cylinder and piston | | |
| 24 | rotatable disk | | |
| 25 | rods | 26 | cursors |
| 27 | external jaws | | |
| 28 | first fixed disk | 29 | second fixed disk |

What is claimed is:

1. A positioning device intended for positioning a member appointed to operate on an object, comprising an operating member, displacement means for said operating member, a computer controlling said displacement means and an explorative member coordinated with said operating member, intended to explore said object on which said operating member should operate, in order to determine the correct working positions of said operating member, wherein said explorative member is a mechanical touching member, it is solid with said operating member, and it is displaced together with the operating member by said computer controlled displacement means, said computer controlled displacement means being common to both said touching member and said operating member.

2. A positioning device as set forth in claim 1, comprising a common supporting member, both said operating member and said touching member being mounted on said common supporting member, thus forming a touching and operating unit, said computer controlled displacement means operating on said common supporting member.

3. A positioning device as set forth in claim 1, wherein said computer is programmed in order to determine by means of said touching member, and to memorize, the positions of a plurality of points of said object on which said operating member should perform its operation, then determining by interpolation the entire work trajectory to be followed by said operating member.

4. A positioning device as set forth in claim 1, wherein said displacement means are arranged for providing positioning displacements of said operating and touching members according to a first and a second directions, mutually orthogonal, and to provide working shift displacements according to a third direction, orthogonal with respect to said first and second directions.

5. A positioning device as set forth in claims 1, wherein said operating member is a welding head.

6. A welding apparatus including at least one positioning device intended for positioning a member appointed to operate on an object, said positioning device comprising an operating member, displacement means for said operating member, a computer controlling said displacement means and an explorative member coordinated with said operating member, intended to explore said object on which said operating member should operate, in order to determine the correct working positions of said operating member, said explorative member being a mechanical touching member, being solid with said operating member, and being displaced together with the operating member by said computer controlled displacement means, said computer controlled displacement means being common to both said touching member and said operating member, wherein said operating member is a welding head.

7. A welding apparatus as set forth in claim 6, intended to perform inner weldings between tube sections of a piping, comprising a body, means for immobilizing said body inside a tube section, and a revolving portion shaped like a roundabout, carrying said touching and operating devices.

8. A welding apparatus as set forth in claim 6, intended to perform inner weldings between tube sections of a piping, comprising a body and expandable jaws arranged in crowns in said body, intended for centering and immobilizing said body inside a tube section.

9. A welding apparatus as set forth in claim 6, intended to perform inner weldings between tube sections of a piping, comprising a body and expandable jaws arranged in crowns in said body, intended for centering and immobilizing said body inside a tube section, at least some of said jaw crowns also having the task of improving, when needed, the circular outline of the end portions of the tube sections to be welded.

10. A welding apparatus as set forth in claim 6, intended to perform inner weldings between tube sections of a piping, and comprising a body, and three crowns of expandable jaws, namely: a rear crown and a front crown for anchoring and centering said body to an already installed tube section, and an external crown for anchoring and centering an additional tube section intended to be welded to the already installed tube section, said jaws including little wheels which, in the front and external jaws, are pivoted along an axial direction of the apparatus, whereas the wheels of the rear jaws are pivoted along a tangential direction.

11. A welding apparatus as set forth in claim 6, intended to perform inner weldings between tube sections of a piping, and comprising a body, wherein said body has idle supporting wheels and driven advancement wheels, and includes an autonomous control group comprising at least a computer, an electric battery and a control board, said welding apparatus further comprising a composite cable, said composite cable being connectable to said control group and to external feed and control means.

* * * * *